No. 782,042. PATENTED FEB. 7, 1905.
B. J. MULLEN.
GAS WASHER.
APPLICATION FILED JULY 8, 1904.
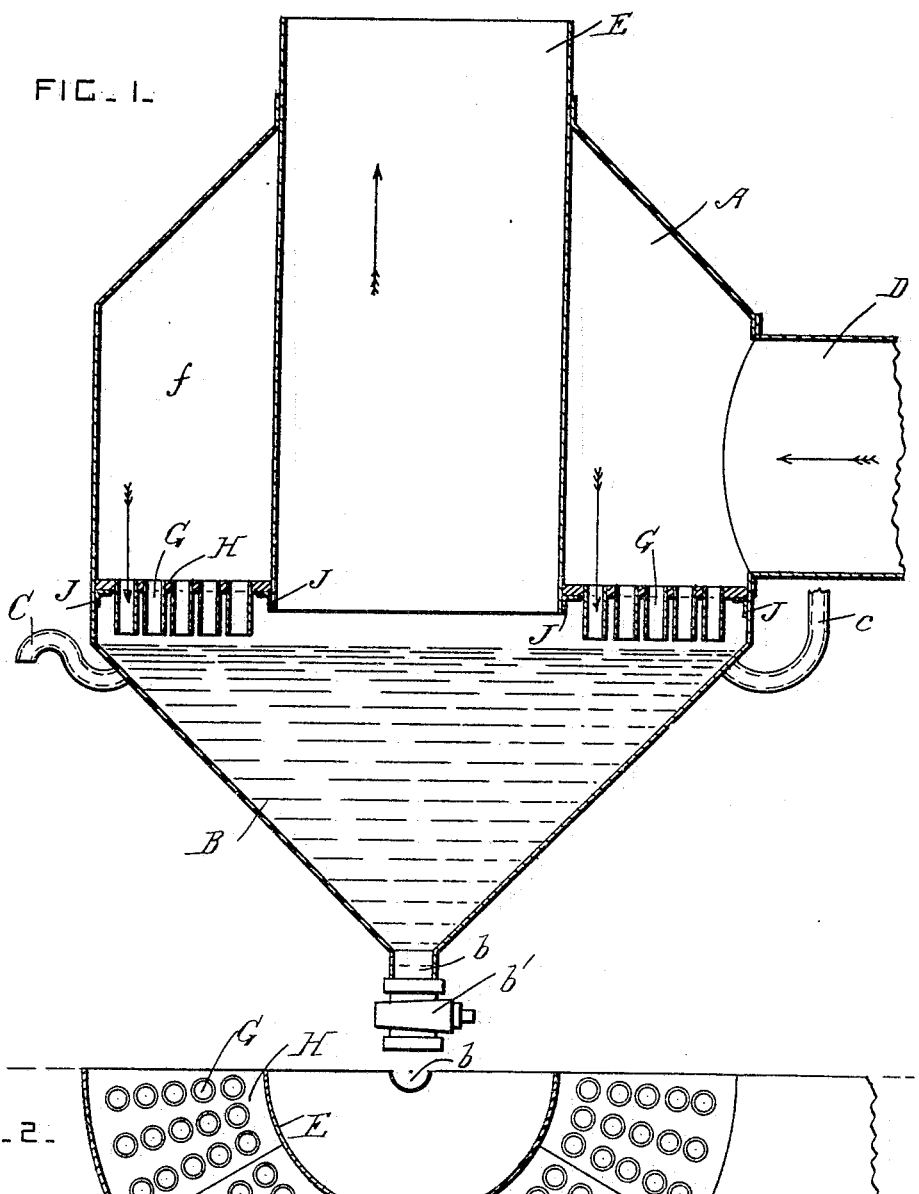
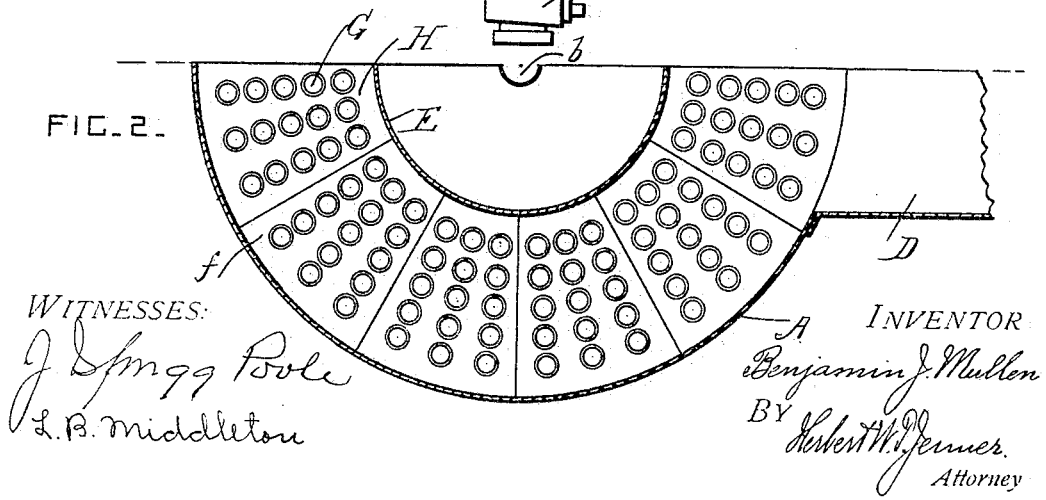

No. 782,042.  
Patented February 7, 1905.

UNITED STATES PATENT OFFICE.

BENJAMIN J. MULLEN, OF LEETONIA, OHIO.

GAS-WASHER.

SPECIFICATION forming part of Letters Patent No. 782,042, dated February 7, 1905.

Application filed July 8, 1904. Serial No. 215,775.

*To all whom it may concern:*

Be it known that I, BENJAMIN J. MULLEN, a citizen of the United States, residing at Leetonia, in the county of Columbiana and State of Ohio, have invented certain new and useful Improvements in Gas-Washers; and I do hereby declare the following to be a full, clear, and exact description of the invention, such as will enable others skilled in the art to which it appertains to make and use the same.

This invention relates to gas-washers for use in connection with blast-furnaces; and it consists in the novel construction and combination of the parts hereinafter fully described and claimed.

In the drawings, Figure 1 is a vertical section through the gas-washer. Fig. 2 is a partial sectional plan view of the same.

The washing of the gas is effected in a large vessel A. The lower part B of this vessel contains water, and $b$ is the outlet-pipe at the bottom of the vessel through which the water and dirt are removed periodically. This pipe is provided with any suitable valve $b'$.

C is an overflow-pipe and water seal arranged at about the level of the water in the washer, and $c$ is the inlet or supply pipe for water.

D is the inlet-pipe for the gas, which is connected to the side of the washer and which conducts the gas into it from the blast-furnace.

E is the outlet-pipe for the gas after being washed. The pipe E depends from the upper part of the washer to within a short distance of the water-level, and it conducts the washed gas to the boiler or stoves, where it is used in the usual way. The outlet-pipe E forms an annular chamber $f$ inside the washer, and the lower part of this annular chamber is divided into a series of smaller gas-chambers G. The gas is brought in contact with the surface of the water as it issues from these small chambers G. The small gas-chambers G preferably consist of short open-ended pipes which are secured into plates H. These plates H are arranged side by side and they form an annular head at the lower part of the annular gas-chamber $f$.

J represents angle-iron brackets for supporting the said plates. These angle-irons are secured to the vessel A and to the lower part of the outlet-pipe, so that the outlet-pipe is used as a support, and no additional means are necessary for supporting the plates and the pipes or small chambers carried by them.

The gas which enters the washer is divided into small volumes before being brought into contact with the water, and this subdivision of the gas insures the whole of it being brought in contact with the water. The gas impinges on the surface of the water as it passes out of the small chambers or pipes and parts with its dust and other impurities, which are taken up by the water. The clean gas passes between the short pipes and into the bottom of the outlet-pipe and thence upwardly to the boilers or stoves, as indicated by the arrows in the drawings.

What I claim is—

1. In a gas-washer, the combination, with a vessel for holding water provided with an inlet-pipe, and an outlet-pipe which depends within the said vessel and forms an annular gas-chamber within it; of a head supported at the lower part of the said annular gas-chamber, and a series of open-ended chambers carried by the said head and operating to divide the gas into small volumes before it touches the water.

2. In a gas-washer, the combination, with a vessel for holding water provided with an inlet-pipe, and an outlet-pipe which depends within the said vessel and forms an annular gas-chamber within it; of supports secured to the lower part of the said inlet-pipe and to the said vessel, removable plates which rest on the said supports, and a series of open-ended chambers depending from the said plates and operating to divide the gas into small volumes before it touches the water.

In testimony whereof I have affixed my signature in the presence of two witnesses.

BENJAMIN J. MULLEN.

Witnesses:
G. H. IRWIN,
JOHN B. MORGAN.